United States Patent
Sheflin et al.

(10) Patent No.: US 12,485,485 B2
(45) Date of Patent: Dec. 2, 2025

(54) METAL DROP EJECTING THREE-DIMENSIONAL (3D) OBJECT PRINTER AND IMPROVED METHOD FOR OPERATING THE PRINTER

(71) Applicant: ADDITIVE TECHNOLOGIES LLC, Palm City, FL (US)

(72) Inventors: Joseph C. Sheflin, Macedon, NY (US); Chu-Heng Liu, Penfield, NY (US); Paul J. McConville, Webster, NY (US); Peter Knausdorf, Henrietta, NY (US); Alexander J. Fioravanti, Penfield, NY (US); Palghat S. Ramesh, Pittsford, NY (US)

(73) Assignee: Additive Technologies LLC, Palm City, FL (US)

(*) Notice: Subject to any disclaimer, the term of this patent is extended or adjusted under 35 U.S.C. 154(b) by 777 days.

(21) Appl. No.: 17/455,590

(22) Filed: Nov. 18, 2021

(65) Prior Publication Data

US 2023/0150026 A1     May 18, 2023

(51) Int. Cl.
| | |
|---|---|
| B22F 10/22 | (2021.01) |
| B22D 23/00 | (2006.01) |
| B22F 10/85 | (2021.01) |
| B22F 12/50 | (2021.01) |
| B33Y 10/00 | (2015.01) |
| B33Y 30/00 | (2015.01) |
| B33Y 50/02 | (2015.01) |

(52) U.S. Cl.
CPC ............ *B22F 10/22* (2021.01); *B22D 23/003* (2013.01); *B22F 10/85* (2021.01); *B22F 12/50* (2021.01); *B33Y 10/00* (2014.12); *B33Y 30/00* (2014.12); *B33Y 50/02* (2014.12)

(58) Field of Classification Search
CPC ....................................................... B22F 10/22
See application file for complete search history.

(56) References Cited

U.S. PATENT DOCUMENTS

| | | |
|---|---|---|
| 9,616,494 B2 | 4/2017 | Vader et al. |
| 10,040,119 B2 | 8/2018 | Vader et al. |

(Continued)

OTHER PUBLICATIONS

Furumoto, Tatsuaki, et al. "Permeability and strength of a porous metal structure fabricated by additive manufacturing." Journal of Materials Processing Technology 219 (2015): 10-16. (Year: 2015).*

(Continued)

*Primary Examiner* — Jophy S. Koshy
*Assistant Examiner* — Joshua S Carpenter
(74) *Attorney, Agent, or Firm* — Maginot Moore & Beck LLP

(57) ABSTRACT

A three-dimensional (3D) metal object manufacturing apparatus is configured to eject melted metal drops from an ejector head at different velocities to form different portions of metal object layers with different measurable values of a same physical property. The different velocities are achieved by operating the ejector head with two different electrical voltages. The greater voltage that achieves the higher velocity is about 25% greater than the voltage used to achieve the lesser velocity. By operating the ejector head with the two different voltages different portions of the object can be formed with different physical property characteristics.

17 Claims, 5 Drawing Sheets

(56) References Cited

U.S. PATENT DOCUMENTS

| | | | |
|---|---|---|---|
| 2015/0273577 A1* | 10/2015 | Vader | B22F 12/53 |
| | | | 164/513 |
| 2017/0252821 A1 | 9/2017 | Sachs et al. | |
| 2017/0252830 A1* | 9/2017 | Sachs | B05B 5/025 |
| 2018/0141151 A1 | 5/2018 | Liang et al. | |
| 2019/0283136 A1 | 9/2019 | Ruppenthal et al. | |
| 2020/0324486 A1* | 10/2020 | Mantell | B29C 64/112 |

OTHER PUBLICATIONS

Qiu, Chunlei, et al. "On the role of melt flow into the surface structure and porosity development during selective laser melting." Acta Materialia 96 (2015): 72-79. (Year: 2015).*

Gibson, Ian, et al. Additive manufacturing technologies. 2nd Ed. Cham, Switzerland: Springer, 2015. (Year: 2015).*

Sukhotskiy, Viktor. Computational Analysis of Liquid Metal Drop-on-Demand Jetting and Solidification Using a Contactless Magnetohydrodynamic Actuator. Diss. State University of New York at Buffalo, 2021. (Year: 2021).*

* cited by examiner

METAL DROP EJECTING THREE-DIMENSIONAL (3D) OBJECT PRINTER AND IMPROVED METHOD FOR OPERATING THE PRINTER

TECHNICAL FIELD

This disclosure is directed to melted metal ejectors used in three-dimensional (3D) object printers and, more particularly, to the ejection of the melted metal drops to form objects in those systems.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject UV-curable materials, such as photopolymers or elastomers. The printer typically operates one or more extruders to form successive layers of the plastic material that form a three-dimensional (3D) printed object with a variety of shapes and structures. After each layer of the three-dimensional printed object is formed, the plastic material is UV cured and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of melted metal through one or more nozzles to form 3D objects. These printers have a source of solid metal, such as a roll of wire or pellets, that is fed into a chamber of an ejector head where an external heater is operated to melt the solid metal. The ejector head is positioned within the opening of an electrical coil. An electrical current is passed through the coil to produce an electromagnetic field that causes the meniscus of the melted metal at a nozzle of the chamber to separate from the melted metal within the chamber and be propelled from the one or more nozzles. This type of metal drop ejecting printer is called a magnetohydrodynamic (MHD) printer by some in the art.

A platform is positioned opposite the nozzle(s) of the ejector and the ejector head is moved in a X-Y plane parallel to the plane of the platform by a controller operating actuators so the melted metal drops ejected from the nozzle form metal layers of an object on the platform. Another actuator is operated by the controller to alter the position of the ejector head or platform in the vertical or Z direction to position the ejector head and an uppermost layer of the metal object being formed by a distance appropriate for continuation of the object formation.

One type of MHD printer builds parts with drops exiting the nozzle at ~400 Hz. The bulk metals melted for ejection from the nozzle of this printer include Al 6061, 356, 7075 and 4043. The size of the ejected drops is ~0.5 mm in diameter and these drops spread to a size of ~0.7 mm in diameter upon contact with the part surface. The melting temperature of these aluminum alloys is approximately 600° C. Empirical studies have shown that the optimal receiving surface temperature needs to be from ~400° C. to ~550° C. for good adherence to the previously formed surface. At these object surface temperatures the melted metal drops combine with the build part to form a consistent build structure.

To commence printing operations with an MHD printer, the operator of the printer must perform a start-up procedure. This procedure includes bringing the printer to its operational temperature, which is typically about 825° C., filling the supply reservoir within the printer with melted aluminum, and setting the drop mass that is used during the manufacture process to form the layers of the object. After the start-up routine is completed and the operational parameters, such as the melted metal drop mass, are determined, the printer is operated to form the metal object. During the manufacturing process, the operational parameters determined during the start-up procedure are not changed.

One issue that arises during the performance of the start-up procedure is the balancing of the operational parameter values required for a part. Parameter values that yield a good surface quality are not the best values for providing the best mechanical properties of the part and vice versa. These conflicting goals lead to a reduced latitude for material properties of the part as well as the surface finish of the part. Thus, the parameter values determined during start-up are a compromise so the range that can be used for the parameter values has to be small. Being able to use a wider range of parameter values to achieve competing goals for object properties would be beneficial.

SUMMARY

A new 3D metal object printer changes operational parameter values during manufacture of a part. The 3D metal object printer includes an ejector head configured to eject melted metal drops, an electrical power supply configured to supply selectively electrical power to the ejector head at a first voltage level and a second voltage level, the first voltage level being greater than the second voltage level, and a controller operatively connected to the ejector head and the electrical power supply. The controller is configured to operate the electrical power supply to supply electrical power at the first voltage level when the melted metal drops ejected by the ejector head are forming a first portion of a layer of a metal object and to operate the electrical power supply to supply electrical power at the second voltage level when the melted metal drops ejected by the ejector head are forming a second portion of the layer of the metal object, the first portion of the layer having a first measurable value for a physical property that is measurably greater than a second measurable value for the physical property that the second portion of the layer has.

A method of operating a 3D metal object printer changes operational parameter values during manufacture of a part. The method includes operating an electrical power supply to supply electrical power at a first voltage level to an ejector head when melted metal drops ejected by the ejector head are forming a first portion of a layer of a metal object, and operating the electrical power supply to supply electrical power at a second voltage level when the melted metal drops ejected by the ejector head are forming a second portion of the layer of the metal object, the first voltage level being greater than the second voltage level.

BRIEF DESCRIPTION OF THE DRAWINGS

The foregoing aspects and other features of a 3D metal object printer and its method of operation that change operational parameter values during manufacture of a part are explained in the following description, taken in connection with the accompanying drawings.

DETAILED DESCRIPTION

Figure 1:
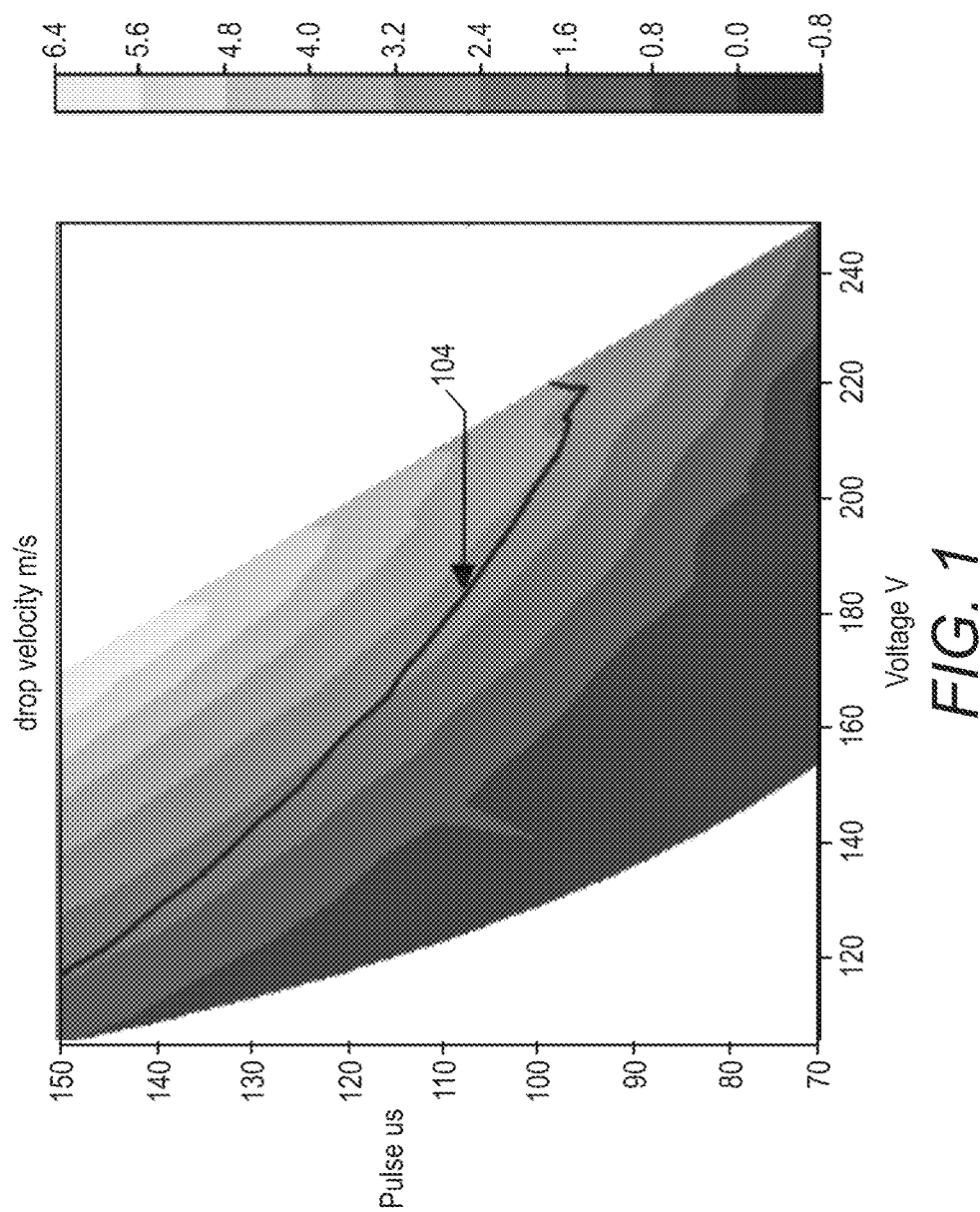
FIG. 1 is a graph showing the effects of ejection pulse width, ejection pulse voltage, and drop mass velocity on one another.

For a general understanding of the 3D metal object printer and its operation that changes operational parameter values during manufacture of a metal object, reference is made to the drawings. In the drawings, like reference numerals designate like elements.

Figure 5:
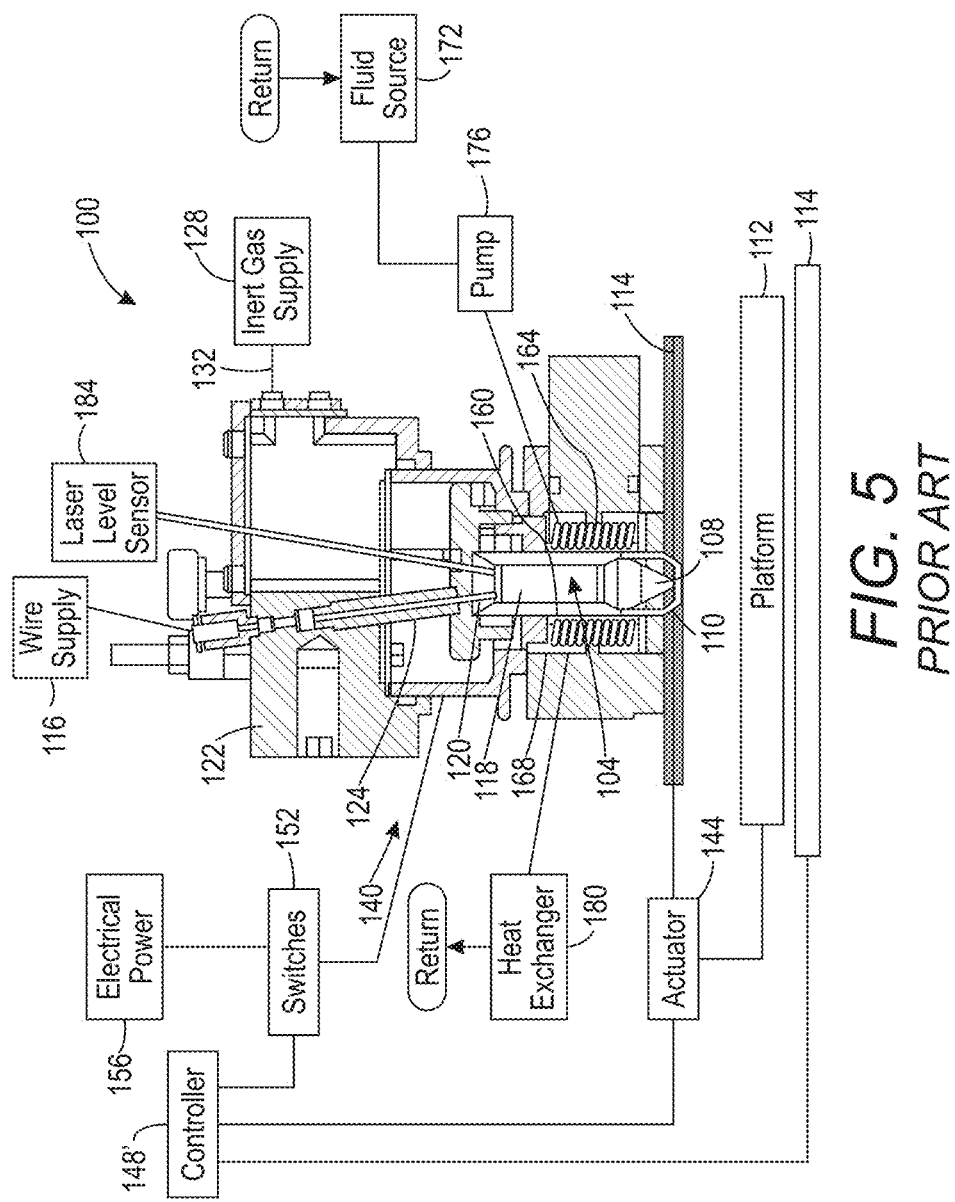
FIG. 5 depicts a previously known 3D metal object printer that does not change operational parameter values during manufacture of a metal object.

FIG. 5 illustrates an embodiment of a prior art 3D metal object printer 100 that does not change the operational parameter values after their determination during the start-up procedure. The platform 112 is a solid metal plate. The heating elements of the heater 114 are operatively connected to the controller 148 for operation of the heating elements. In the printer of FIG. 5, drops of melted bulk metal are ejected from a receptacle of a removable vessel 104 having a single nozzle 108 and drops from the nozzle form swaths for layers of an object on a platform 112. As used in this document, the term "removable vessel" means a hollow container having a receptacle configured to hold a liquid or solid substance and the container as a whole is configured for installation and removal in a 3D metal object printer. As used in this document, the term "bulk metal" means conductive metal available in aggregate form, such as wire of a commonly available gauge or pellets of macro-sized proportions. A source of bulk metal 116, such as metal wire 120, is fed into a wire guide 124 that extends through the upper housing 122 in the ejector head 140 and melted in the receptacle of the removable vessel 104 to provide melted metal for ejection from the nozzle 108 through an orifice 110 in a baseplate 114 of the ejector head 140. As used in this document, the term "nozzle" means an orifice in a removable vessel configured for the expulsion of melted metal drops from the receptacle within the removable vessel. As used in this document, the term "ejector head" means the housing and components of a 3D metal object printer that melt, eject, and regulate the ejection of melted metal drops for the production of metal objects.

With continued reference to FIG. 5, a melted metal level sensor 184 includes a light source and a reflective sensor. In one embodiment, the light source is a laser and, in some embodiments, a blue laser. The reflection of the laser off the melted metal level is detected by the reflective sensor, which generates a signal indicative of the distance to the melted metal level. The controller receives this signal and determines the level of the volume of melted metal in the removable vessel 104 so it can be maintained at the upper level 118 in the receptacle of the removable vessel. The removable vessel 104 slides into the heater 160 so the inside diameter of the heater contacts the removable vessel and can heat solid metal within the receptacle of the removable vessel to a temperature sufficient to melt the solid metal. As used in this document, the term "solid metal" means a metal as defined by the periodic chart of elements or alloys formed with these metals in solid rather than liquid or gaseous form. The heater is separated from the removable vessel to form a volume between the heater and the removable vessel 104.

Continuing with the discussion of the printer shown in FIG. 5, an inert gas supply 128 provides a pressure regulated source of an inert gas, such as argon, to the ejector head through a gas supply tube 132. The gas flows through the volume between the heater and the removable vessel and exits the ejector head around the nozzle 108 and the orifice 110 in the baseplate 114. This flow of inert gas proximate to the nozzle insulates the ejected drops of melted metal from the ambient air at the baseplate 114 to prevent the formation of metal oxide during the flight of the ejected drops.

The ejector head 140 of FIG. 5 is movably mounted within Z-axis tracks for vertical movement of the ejector head with respect to the platform 112. One or more actuators 144 are operatively connected to the ejector head 140 to move the ejector head along a Z-axis while other actuators 144 are operatively connected to the platform 112 to move the platform in an X-Y plane beneath the ejector head 140. The actuators 144 are operated by a controller 148 to maintain an appropriate distance between the orifice 110 in the baseplate 114 of the ejector head 140 and an uppermost surface of an object on the platform 112.

Moving the platform 112 of FIG. 5 in the X-Y plane as drops of molten metal are ejected toward the platform 112 forms a swath of melted metal drops on the object being formed. Controller 148 also operates actuators 144 to adjust the vertical distance between the ejector head 140 and the most recently formed layer on the substrate to facilitate formation of other structures on the object. While the molten metal 3D object printer 100 is depicted in FIG. 5 as being operated in a vertical orientation, other alternative orientations can be employed. Also, while the embodiment shown in FIG. 5 has a platform that moves in an X-Y plane and the ejector head moves along the Z axis, other arrangements are possible. For example, the actuators 144 can be configured to move the ejector head 140 in the X-Y plane and along the Z axis or they can be configured to move the platform 112 in both the X-Y plane and Z-axis.

The controller 148 operates the switches 152 selectively. One switch 152 can be selectively operated by the controller to provide electrical power from source 156 to the heater 160, while another switch 152 can be selectively operated by the controller to provide electrical power from another electrical source 156 to the coil 164 for generation of the electrical field that ejects a drop from the nozzle 108. Because the heater 160 generates a great deal of heat at high temperatures, the coil 164 is positioned within a chamber 168 formed by one (circular) or more walls (rectilinear shapes) of the ejector head 140. As used in this document, the term "chamber" means a volume contained within one or more walls in which a heater, a coil, and a removable vessel of a 3D metal object printer are located. The removable vessel 104 and the heater 160 are located within this chamber. The chamber is fluidically connected to a fluid source 172 through a pump 176 and also fluidically connected to a heat exchanger 180. As used in this document, the term "fluid source" refers to a container of a liquid having properties useful for absorbing heat. The heat exchanger 180 is connected through a return to the fluid source 172. Fluid from the source 172 flows through the chamber to absorb heat from the coil 164 and the fluid carries the absorbed heat through the exchanger 180, where the heat is removed by known methods. The cooled fluid is returned to the fluid source 172 for further use in maintaining the temperature of the coil in an appropriate operational range.

The controller 148 of the 3D metal object printer 100 requires data from external sources to control the printer for metal object manufacture. In general, a three-dimensional model or other digital data model of the object to be formed is stored in a memory operatively connected to the controller 148, the controller can access through a server or the like a remote database in which the digital data model is stored, or a computer-readable medium in which the digital data model is stored can be selectively coupled to the controller 148 for access. This three-dimensional model or other digital data model is processed by a slicer implemented with the controller to generate machine-ready instructions for execution by the controller 148 in a known manner to operate the components of the printer 100 and form the metal object corresponding to the model. The generation of the machine-ready instructions can include the production of intermediate models, such as when a CAD model of the device is converted into an STL data model, or other polygonal mesh or other intermediate representation, which can in turn be processed to generate machine instructions, such as g-code, for fabrication of the device by the printer. As used in this document, the term "machine-ready instructions" means computer language commands that are executed by a computer, microprocessor, or controller to operate components of a 3D metal object additive manufacturing system to form metal objects on the platform 112. The controller 148 executes the machine-ready instructions to control the ejection of the melted metal drops from the nozzle 108, the positioning of the platform 112, as well as maintaining the distance between the orifice 110 and the uppermost layer of the object on the platform 112.

The controller 148 can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 148 from either a scanning system or an online or work station connection for processing and generation of the signals that operate the components of the printer 100 to form an object on the platform 112.

Using a high speed camera to observe ejected melted metal drops against a linear measurement scale, the velocity of ejected melted metal drops at a plurality of ejection pulses was determined. A model of the results showing the drop mass, ejection pulse width, and ejection pulse voltage is presented in FIG. 1. The black line 104 in the model is a typical target drop mass used for producing metal objects, which is 1.5 grams. As can be seen from the model, an increase in the ejection pulse voltage increases the ejected drop velocity while maintaining the target drop mass. As shown in FIG. 1, an ejection pulse voltage of approximately 160 Volts (V) produces a drop velocity of about 2.4 m/s, while a pulse voltage of approximately 200 V produces a drop velocity of about 3.2 m/s. Thus, a voltage increase of about 25% results in a 33% increase in drop velocity.

Figure 2:
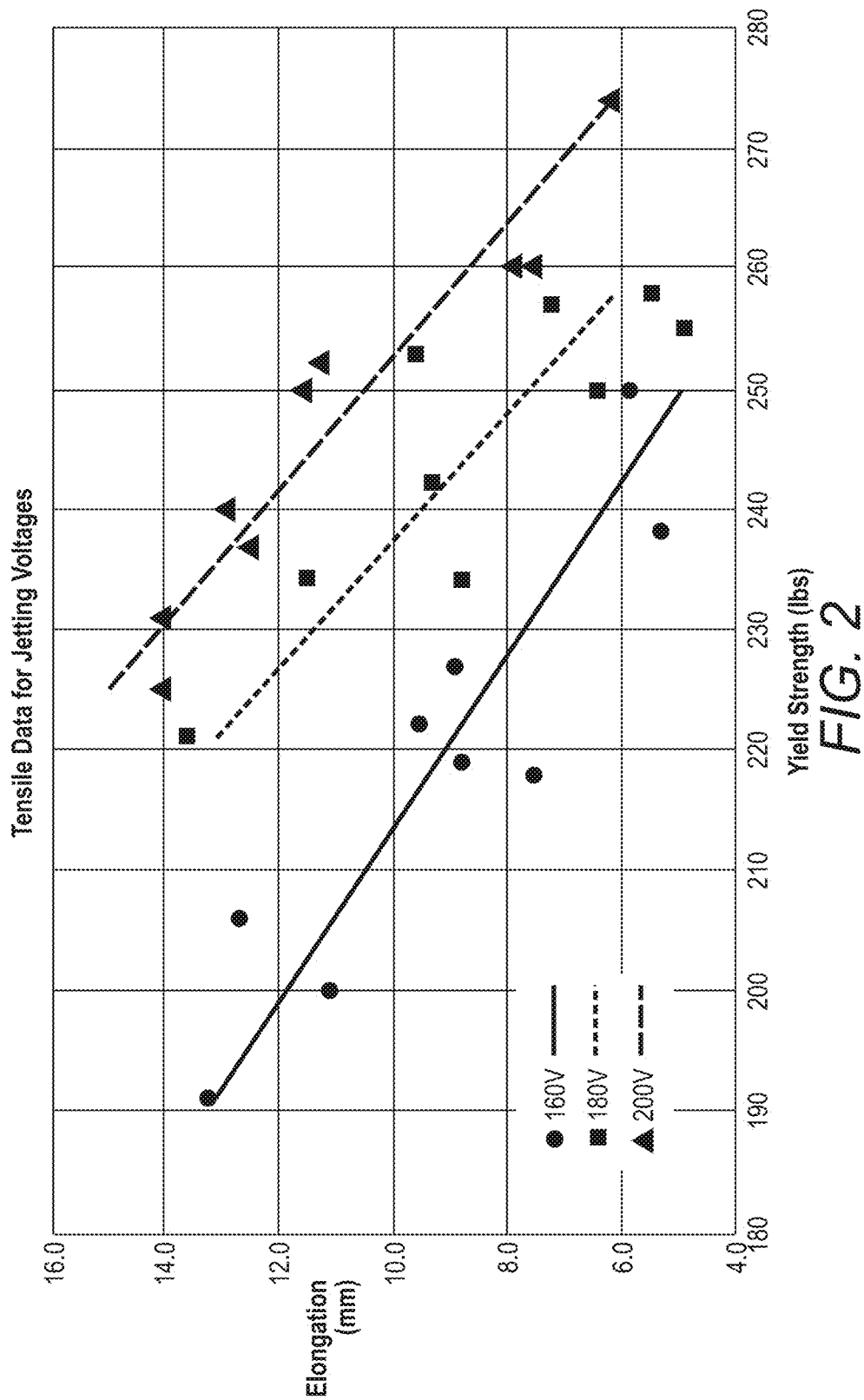
FIG. 2 is a graph showing the effect of ejection pulse voltage on elongation of an ejected melted metal drop and tensile strength of an object.

Next, metal objects were formed with melted metal drops having a mass of approximately 1.5 grams that were ejected with 160 V ejection pulses and then metal objects were formed with 1.5 gram melted metal drops ejected with 200 V ejection pulses. Physical properties of the two metal objects were compared to determine the effects of ejecting the melted metal drops at two different velocities. As used in this document, the term "physical property" means a characteristic of matter that can be observed and measured without a chemical change to the matter. Specifically, the objects formed with the drops ejected with the 160 V pulses had smoother surfaces than the objects formed with the drops ejected with the 200 V pulses. The objects were then subjected to tensile strength tests and the results of that testing are shown in FIG. 2. The objects formed with the drops ejected by the 200 V pulses exhibit greater tensile strength than the objects formed with the 160 V pulses. Thus, the tensile strength of the object formed with the melted drops ejected at 3.4 m/s is measurably greater. As used in this document, the term measurably greater means the greater measurement value of a physical property is about 10% greater than the lesser measurement value of the same physical property.

Figure 3:
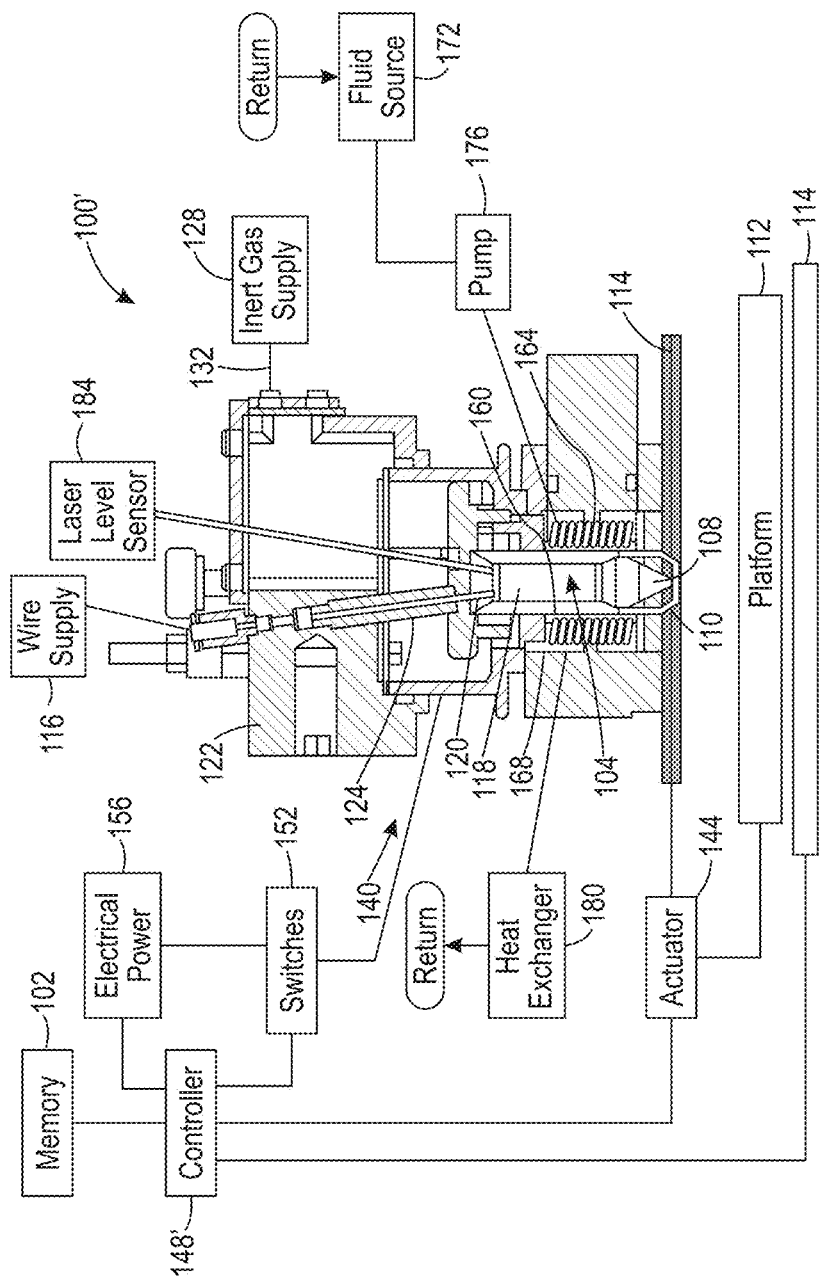
FIG. 3 is schematic diagram of a 3D metal object printer that changes operational parameter values during manufacture of a metal object.

These results were used to reconfigure the programmed instructions that are stored in a non-transitory computer readable media, such as non-volatile memory 102, that is operatively connected to the controller 148' of the printer 100' shown in FIG. 3. When these instructions are executed by the controller, the power supply 156 is operated at a higher voltage when melted metal drops that form interior portions of the object are being ejected and the power supply is operated at a lower voltage when melted metal drops that form surface features of the object are being ejected. In this manner, the interior portions of the object exhibit greater tensile strength while the exposed areas of the object present better surface characteristics.

The controller 148' of the 3D metal object printer 100' requires data from external sources to control the printer for object formation. In general, a three-dimensional model or other digital data model of the object to be formed is received by the controller from a memory, server, remote database, or a computer-readable non-transitory medium operatively connected to the controller. The three-dimensional model or other digital data model is used by the controller to generate machine-ready instructions for execution by the controller 136 to operate the components of the printer 100 and fabricate the object corresponding to the model. The generation of the machine-ready instructions can include the production of intermediate models, such as when a CAD model of the object is converted into an STL data model, or other polygonal mesh or other intermediate representation, which can in turn be processed to generate machine-ready instructions, such as g-code for fabrication of the object by the printer. As used in this document, the term "machine-ready instructions" means computer language commands that are executed by a computer, microprocessor, or controller to operate components of a 3D metal object additive manufacturing system to form a metal object. The controller 148' executes the machine-ready instructions to control the ejection of the metal drops from the printhead 104, the positioning of stage 148 and the platform 112, the distance between the printhead 102 and the uppermost layer of the object, and the voltage of the power supply as described previously.

Figure 4:
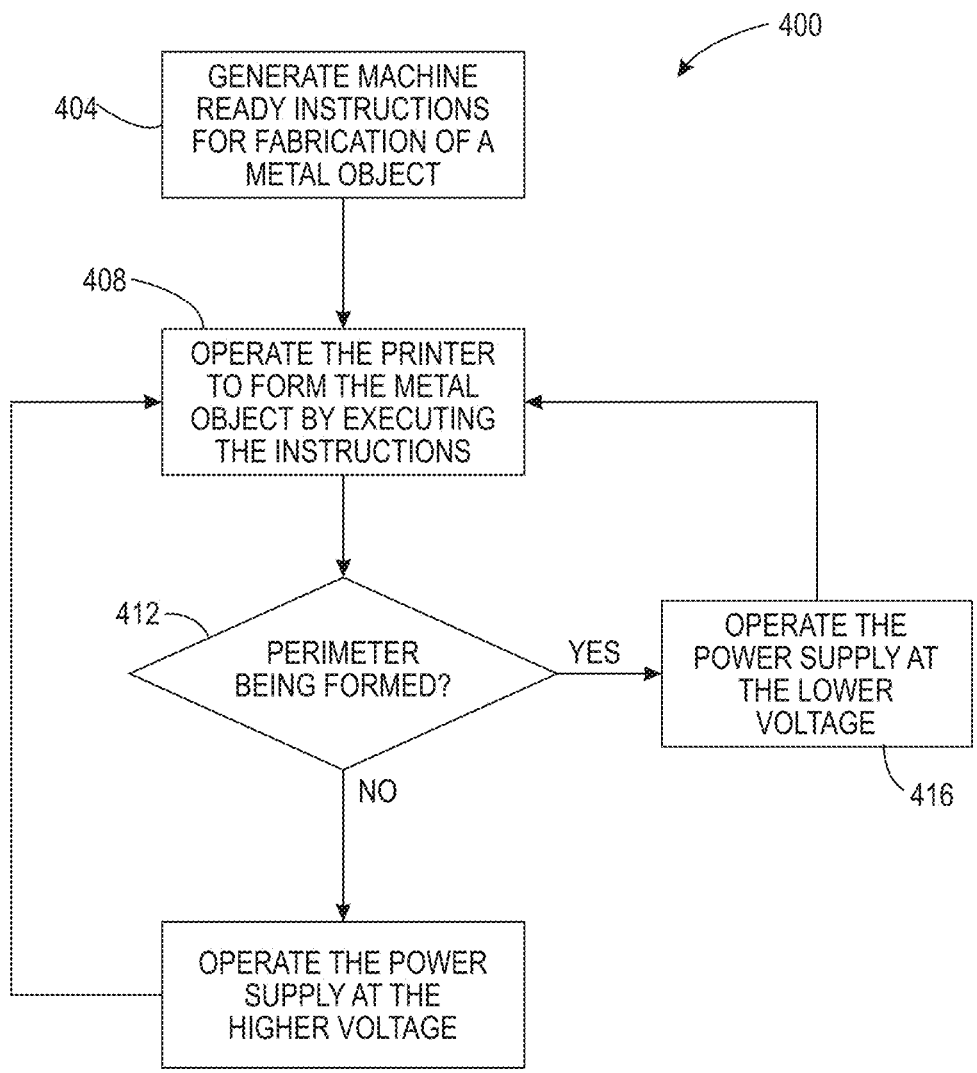
FIG. 4 is a flow diagram of a process for operating the 3D metal object printer of FIG. 3.

A process for operating the printer of FIG. 3 is shown in FIG. 4. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 148' noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 4 is a flow diagram 400 of a process that operates the printer 100'. The process begins at printer start-up with generation of the machine-ready instructions (block 404). The process executes the machine-ready instructions to operate the printer and form the metal object (block 408). When the process detects one or more instructions for forming a perimeter of a layer (block 412), then the power supply voltage level is set to a lower level, such as 160 V (block 416) and the printer is operated to form the perimeter with the power supply set at the lower level (block 408). Otherwise, an interior portion of a layer is being formed so the power supply voltage level is set to a higher level, such as 200 V (block 420) and the printer is operated to form the perimeter with the power supply set at the higher level (block 408). The process continues until the build process is finished.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A melted metal drop ejecting apparatus comprising:
an ejector head configured to eject melted metal drops;
an electrical power supply configured to supply selectively electrical power to the ejector head at a first voltage level and a second voltage level, the first voltage level being greater than the second voltage level; and
a controller operatively connected to the ejector head and the electrical power supply, the controller being configured to operate the electrical power supply to supply electrical power at the first voltage level when the melted metal drops ejected by the ejector head are forming a first portion of a layer of a metal object and to operate the electrical power supply to supply electrical power at the second voltage level when the melted metal drops ejected by the ejector head are forming a second portion of the layer of the metal object, the first portion of the layer having a first measurable value for tensile strength that is at least 10 percent greater than a second measurable value for tensile strength in the second portion of the layer, the controller being further configured to:

operate the ejector head to eject melted metal drops at a first velocity when the ejector head is supplied with electrical power at the first voltage level to form the first portion of the layer; and
operate the ejector head to eject melted metal drops at a second velocity when the ejector head is supplied with electrical power at the second voltage level to form the second portion with a surface smoothness that is greater than a surface smoothness of the first portion of the layer, wherein the first voltage level is greater than the second voltage level and the first velocity is greater than the second velocity.

2. The apparatus of claim 1, the controller being further configured to operate the ejector head to form the first portion of the layer as an interior portion of the layer and to form the second portion of the layer as a perimeter of the layer, the perimeter of the layer having a surface smoothness that is greater than a surface smoothness of the interior portion of the layer.

3. The apparatus of claim 1 wherein the first voltage level is 25% greater than the second voltage level.

4. The apparatus of claim 1 wherein the first velocity is 3.2 meters/second and the second velocity is 2.4 meters/second.

5. The apparatus of claim 1, the controller being further configured to operate the ejector head to eject melted metal drops having a same mass.

6. The apparatus of claim 1 wherein the second velocity is at least 2.4 meters/second.

7. The apparatus of claim 3 wherein the first voltage level is 200 V and the second level is 160 V.

8. The apparatus of claim 5 wherein the same mass is approximately 1.5 grams.

9. A method for operating a melted metal drop ejecting apparatus comprising:
operating an electrical power supply to supply electrical power at a first voltage level to an ejector head when melted metal drops ejected by the ejector head are forming a first portion of a layer of a metal object to have a tensile strength with a first measurable value and a surface smoothness with a first measurable value; and
operating the electrical power supply to supply electrical power at a second voltage level when the melted metal drops ejected by the ejector head are forming a second portion of the layer of the metal object to have a tensile strength with a second measurable value and a surface smoothness with a second measurable value, the first voltage level being greater than the second voltage level, the first measurable value of the tensile strength is at least 10 percent greater than the second measurable value of the tensile strength, and the second measurable value of the surface smoothness of the second portion being greater than the first measurable value of the surface smoothness of the first portion.

10. The method of claim 9 wherein the second portion of the layer is formed as a perimeter of the layer and the first portion of the layer is formed as an interior portion of the layer.

11. The method of claim 9 further comprising:
operating the ejector head to eject melted metal drops at a first velocity when the ejector head is supplied with electrical power at the first voltage level; and
operating the ejector head to eject melted metal drops at a second velocity when the ejector head is supplied with electrical power at the second voltage level to form the second portion with a surface smoothness that is greater than a surface smoothness of the first portion.

12. The method of claim 9 further comprising:
operating the ejector head to eject melted metal drops having a same mass.

13. The method of claim 10 wherein the first voltage level is 25% greater than the second voltage level.

14. The method of claim 13 wherein the first voltage level is 200 V and the second level is 160 V.

15. The method of claim 11 wherein the first velocity is 3.2 meters/second and the second velocity is 2.4 meters/second.

16. The method of claim 11 wherein the second velocity is at least 2.4 meters/second.

17. The method of claim 12 wherein the same mass is approximately 1.5 grams.

* * * * *